Patented Jan. 13, 1970

3,489,218
METHOD OF KILLING ORGANISMS BY USE OF RADIOACTIVE MATERIALS

James O. Means, Tulsa, Okla., assignor to The Dow Chemical Company, Midland, Mich., a corporation of Delaware
No Drawing. Filed Aug. 22, 1966, Ser. No. 573,887
Int. Cl. G21h 5/00
U.S. Cl. 166—247      1 Claim

ABSTRACT OF THE DISCLOSURE

Radioactive materials, especially waste matter comprising such materials, is emplaced in the path of underground fluids, e.g. water, aqueous solutions, or oil, containing bacteria or contacting bacteria along the path, whereby growth of such bacteria in such fluids is inhibited, by being subjected to irradiation from such materials.

---

The invention is concerned with the inhibition of harmful effects caused by bacteria in the earth including both aerobic and anaerobic. It particularly pertains to the destruction or prevention of growth of the aerobic bacteria which are introduced into the earth, as for example in water-flooding operations for the production of petroleum. It includes destruction of bacteria in fluids being produced from the earth.

Bacteria are known to cause corrosion, plugging of water routes or courses through the ground, and to cause contamination and putrefaction. Such harmful effects obviously are, in general, objectionable.

There is need for an effective and dependable method of inhibiting the growth of such bacteria and the destruction thereof, including the protection of water sources for general domestic and industrial use. Such inhibition has particular application to the conditioning of water which is injected into oil-producing strata, in the production of petroleum by water flood procedure.

Although some additives to such water, e.g. quaternary ammonium chloride, have been found effective against some species of anaerobic bacteria, there is at present no known satisfactorily effective bactericide for use against aerobic bacteria. To illustrate this need, an article appeared in the Oil and Gas Journal of Jan. 4, 1965, entitled "Don't Underestimate the Role of Aerobic Bacteria," by G. A. Trautenberg, wherein the harmful effects, particularly of corrosion and plugging, is emphasized. The principal objective of the invention is to provide an effective method of inhibiting the growth and/or destroying harmful bacteria below ground level. A more particular objective is to provide a method of destroying or preventing the growth of bacteria in underground waters including especially those injected, as for example in water flooding operations.

The manner by which these and related objectives are attained will be made clear in the ensuing description and is succinctly defined in the appended claims.

The invention broadly consists of depositing radioactive materials in the path of moving water below ground, particularly employing waste radioactive materials, in an amount thereof sufficient to provide at least 1 megarad of irradiation energy and preferably at least 2 megarads. Higher dosages, e.g., up to 10 or more megarads are suggested. Illustrative of such radioactive waste materials are those resulting from self-sustaining neutron chain reacting systems hereunder or neutronic reactor or atomic piles as described in U.S. Patent 2,708,656 to Fermi et al. The invention may be practiced by placing or positioning a mass or bed of radioactive material so that water will pass therethrough or in the vicinity thereof. One improvement of the invention consists of placing the radioactive material in a suitable container which permits passage of radioactive waves through the walls thereof and positioning the container so that the water must pass in contact with the container.

Recommended procedure is to construct a device of the nature of a heat exchanger, having rods of radio-active material instead of tubes normally present in a heat exchanger, and causing the water containing bacteria to be destroyed or growth inhibited thereby by coming in contact or at least into close range with the rods of radioactive material.

The contrary arrangement may also be employed wherein the water is passed through pipes or closed conduits which are laid in contact with or in close proximity to buried radioactive material.

In instances wherein the amount of water in which bacteria are desired to be eliminated is small, a safe convenient size portable container which serves as a source of radioactive material, may be provided. Such container can be transported to the desired location (being small enough to be carried) and there placed in a position where water injected down a well or directly into a formation, must pass in contact with the container, thereby substantially insuring the elimination of bacteria therein. Illustrations of such need are the use of thickened fracturing or flooding water employing such materials as guar gum or other natural gum, most of which are notorious for encouraging the development and rapid growth of bacteria.

A further improvement of the invention is to treat a well contaminated with bacteria by suspending therein a subsurface device containing radioactive material suspended from a wire line whereby the well, borehole, or the like may be satisfactorily treated for the discouragement or complete destruction of the bacteria present therein. The following examples are illustrative of the practice of the invention:

EXAMPLE 1

A water flood system is being employed to produce petroleum from a centrally located well penetrating an oil-bearing formation. The system employs water containing undesirable bacteria which is being injected in multiple wells positioned around the producing well. Radioactive waste is positioned in accordance with the invention so that a major portion of the injected fluid waters must pass in contact with the so positioned radioactive waste. The flood waters thereafter are injected in such manner as to come in contact with the thus emplaced radioactive materials whereby bacteria in the water are destroyed. As a result of such treatment, the corrosion and plugging, otherwise resulting from the presence of such bacteria, are substantially eliminated.

EXAMPLE 2

A further example of the invention is set out below:

A fluid-bearing subterranean formation is to be fractured by injecting a gum-thickened fracturing fluid down a well penetrating the formation at a pressure sufficiently high to fracture the formation. An elongated portable container, having a diameter less than the wellbore and containing radioactive material, is lowered into the wellbore. Thereafter, the well is suitably sealed off. A guar-thickened aqueous liquid, containing flint shot, sand or ground nut shells as proppants, is injected down the well and contacts the container of radioactive material as it passes down the wellbore. Hydraulic pressure of the fluid reaches that which fractures the formation. Thereafter, the fracturing fluid is substantially all removed from the well. The container of radioactive material may be removed for use in other wells or it may be allowed to remain in the well to effectuate sterilization of the hydrocarbonaceous fluid subsequently produced from the formation by way of the well.

EXAMPLE 3

As a variation of Example 2 above, wherein fluids containing harmful bacteria which are sought to be rendered less harmful, are moved in a cased wellbore penetrating a subterranean formation, radioactive material, emitting radiations of at least 1 megarad is admixed with an aqueous cement slurry, prior to or as it is being pumped down the wellbore and is emplaced in the annulus between the casing and the exposed face of the formation. The cement then becomes a solid according to normal cementing operations. Thereafter fluids while being either injected into or produced from the formation via the wellbore will be subjected to the radiation of the waste materials and harmful effects due to bacteria therein will be substantially lessened.

Having described my invention, what I claim and desire to protect by Letters Patent is:

1. The method of destroying bacteria present in moving underground waters and hydrocarbonaceous fluids comprising admixing radioactive material with an aqueous cement slurry and emplacing the so modified cement slurry in the annulus between the casing of a wellbore and the face of the formation traversed thereby, whereby the so emplaced cement hardens in place to form a protective sheath against bacteria growth in fluids moving in said wellbore.

References Cited

UNITED STATES PATENTS

| 788,480 | 4/1905 | Lieber | 252—301.1 X |
|---|---|---|---|
| 1,581,801 | 4/1926 | Henshall et al. | 252—301.1 X |
| 2,352,993 | 7/1944 | Albertson | 252—301.1 X |
| 2,588,210 | 3/1952 | Crisman et al. | 252—301.1 X |
| 2,637,536 | 5/1953 | DeMent | 252—301.1 X |
| 2,835,699 | 5/1958 | Fries | 252—301.1 X |
| 2,962,380 | 11/1960 | Wertheim | 99—217 |
| 3,002,091 | 9/1961 | Armstrong. | |
| 3,070,696 | 12/1962 | McEwen | 252—301.1 X |

CARL D. QUARFORTH, Primary Examiner

S. J. LECHERT, Assistant Examiner

U.S. Cl. X.R.

166—310, 315; 264—.5, 32